United States Patent
Baker et al.

(10) Patent No.: US 8,196,815 B2
(45) Date of Patent: Jun. 12, 2012

(54) SECURE CARD TERMINAL USING KEYPAD SCANNING SEQUENCE DETERMINED BY CARD

(75) Inventors: Keith Baker, Waalre (NL); Johannes Maria Pleunis, Helmond (NL)

(73) Assignee: NXP B.V., Eindhoven (NL)

( * ) Notice: Subject to any disclaimer, the term of this patent is extended or adjusted under 35 U.S.C. 154(b) by 1285 days.

(21) Appl. No.: 10/558,998

(22) PCT Filed: May 28, 2004

(86) PCT No.: PCT/IB2004/050804
§ 371 (c)(1),
(2), (4) Date: Aug. 17, 2009

(87) PCT Pub. No.: WO2004/107255
PCT Pub. Date: Dec. 9, 2004

(65) Prior Publication Data
US 2010/0038421 A1    Feb. 18, 2010

(30) Foreign Application Priority Data
Jun. 3, 2003  (EP) .................................... 03101610

(51) Int. Cl.
*G06K 5/00*   (2006.01)
*H04L 17/02*  (2006.01)
(52) U.S. Cl. .......... 235/380; 235/382; 235/492; 380/52; 379/368
(58) Field of Classification Search ............... 235/380, 235/382, 382.5; 380/52
See application file for complete search history.

(56) References Cited

U.S. PATENT DOCUMENTS

| | | | |
|---|---|---|---|
| 5,077,607 A * | 12/1991 | Johnson et al. ................. 725/74 |
| 5,790,410 A * | 8/1998 | Warn et al. ..................... 700/232 |
| 5,920,730 A | 7/1999 | Vincent |
| 6,054,940 A * | 4/2000 | Greene ........................... 341/26 |
| 6,055,592 A * | 4/2000 | Smith ............................. 710/73 |
| 6,056,193 A * | 5/2000 | McAuliffe et al. ........... 235/380 |
| 6,426,710 B1 | 7/2002 | Chang et al. |

FOREIGN PATENT DOCUMENTS

| | | |
|---|---|---|
| DE | 29918153 | 12/1999 |
| EP | 0763791 | 3/1997 |
| EP | 0843250 | 5/1998 |
| JP | 2031290 | 7/1988 |
| JP | 2165312 | 6/1990 |
| WO | 0201522 | 1/2002 |
| WO | 02091143 | 11/2002 |

OTHER PUBLICATIONS

English abstract of JP2165312.
English abstract of JP2031290.
ISR related to DE29918153.

* cited by examiner

*Primary Examiner* — Thien M. Le
*Assistant Examiner* — Toan Ly

(57) ABSTRACT

To provide alphanumeric data, such as a PIN code, to a smart card (2) a terminal (1) is used which is capable of communicating with the smart card. The terminal comprises a keypad (4) for entering the alphanumeric data and an associated keypad matrix (5) for producing key signals, which the keypad matrix (5) is scanned for any pressed keys using a scanning sequence so as to produce key signals. To securely enter the data without the risk of the terminal intercepting them it is proposed that said scanning sequence is determined by the smart card (2). In this way, the terminal has no knowledge of the actual keys pressed and the secrecy of the alphanumeric data is ensured.

15 Claims, 1 Drawing Sheet

SECURE CARD TERMINAL USING KEYPAD SCANNING SEQUENCE DETERMINED BY CARD

Figure 1:
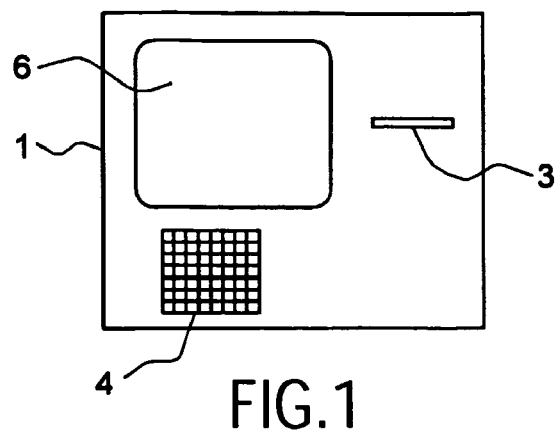

The present invention relates to a secure card terminal and its use. More particularly, the present invention relates to a method of providing alphanumeric data to a smart card using a card terminal, and to a system for subscriber services in which such a terminal is used.

It is well known to use terminals which are provided with a key pad into which a code must be entered to gain access to certain services. Such a code typically is a four-digit code which is used as a Personal Identification Number (PIN) to identify a user. The PIN code may also be used to gain access to a smart card which has been inserted in the terminal. As this access should be restricted to authorized users only, the code should be kept secret. It has been found, however, that software attacks on terminals succeed in detecting and storing the codes entered by its users. It will be clear that this is highly undesirable, as this may enable the attacker to fraudulently obtain access to restricted services, possibly including bank services.

The keypad (or keyboard) of a terminal usually has an associated keypad matrix consisting of a set of row conductors, one conductor corresponding to each row, and a set of column conductors, one conductor corresponding to each column. When a particular key is pressed, an electrical connection is formed between the row and column conductor of that key and the keypad matrix produces a "keypressed" signal. The particular key pressed is then identified by scanning the rows and columns of the keypad matrix and determining in which row and column a specific signal is present. Such a specific signal is caused by the electrical contact made between the row and column conductor due to the pressing of the key.

This scanning of the rows and columns is normally carried out by a keyboard controller which for this purpose may be provided with counters which produce the row and column numbers during the scanning process. As the keyboard controller is part of the terminal, and is accessed by applications running on the terminal, a compromised terminal can determine the key sequence and the associated input data and transmit these to third parties or retain the data for uses not approved by the owner of the terminal U.S. Pat. No. 6,056,193 discloses a computer keyboard with an integral smart card reader. The keyboard is connected to a personal computer. In a PIN entry mode, a switch disconnects the keys from the keyboard controller and connects them to a security module, a dedicated processor. The security module takes control of the keyboard matrix so that any key presses are not detected by the keyboard controller. Instead, the scan lines of the matrix are redirected to the security module, under the control of the security module.

This known arrangement has the disadvantage of requiring an additional dedicated processor, the security module, for its security functions. It will be clear that this additional processor adds to both the cost and the size of the keyboard. In addition, a switch is required, which is also an additional component.

It is an object of the present invention to overcome these and other problems of the Prior Art and to provide a method of entering data in a terminal associated with a smart card that substantially eliminates the risk of the terminal intercepting the data.

Accordingly, the present invention provides a method of providing alphanumeric data to a smart card using a terminal capable of communicating with the smart card, the terminal comprising a keypad for entering the alphanumeric data and an associated keypad matrix for producing key signals, the method comprising the step of scanning the keypad matrix for any pressed keys using a scanning sequence so as to produce key signals, wherein said scanning sequence is determined by the smart card.

As the scanning sequence of the keypad matrix is determined by the smart card and not by the terminal, the terminal has no knowledge of the scanning sequence and therefore cannot determine which keys have been pressed.

In a preferred embodiment, the scanning sequence is altered each time a new set of data is to be entered in the keypad. A single set of data is for example constituted by a PIN code which typically consists of four digits, but which may also consist of three, five, six, or any other suitable number of digits. A new scanning sequence can also be utilized for each user session, that is each time a new user uses the keypad.

It will be understood that the scanning sequence determined by the smart card is preferably different from the scanning sequence determined by the terminal, but this is not necessarily always the case. As long as the scanning sequence is repeatedly changed and the terminal has no knowledge of the scanning sequence, said sequence may at times be identical to the one used by the terminal.

Preferably, the smart card determines each scanning sequence using a random number generator. This ensures that a compromised terminal cannot be used to monitor the scanning sequence and to predict any past or future scanning sequence generated by the smart card.

Preferably, any key signals are passed to the smart card only. That is, the key signals are not communicated to the circuits of the terminal. This provides an additional level of security. In an alternative embodiment, however, any key signals may be stored in a secure storage element in the terminal. This secure storage element may for example be a register having restricted access, being protected with a cryptographic key. In such an embodiment, the smart card could store the key signals in the secure storage element and only provide the secret key to certain trusted software applications in the terminal. In order to further enhance security, the key signals could be stored in the secure storage element in encrypted form.

It will clear from the above description that in the method of the present invention the smart card has direct access to the keypad matrix to the exclusion of the (control circuits of the) terminal itself. The keypad matrix is shielded from the circuits of the terminal when the terminal is put in a protected mode or "PIN Mode", so as to prevent the terminal from observing the keypad actions. This shielding may be accomplished by electrically disconnecting the terminal circuits from the keypad matrix.

The protected mode or "PIN Mode" could for example be activated upon detection of the presence of the smart card, or when pressing a specific key, for instance a dedicated "protected mode key". The pressing of the specific key could be required to start a PIN entry routine or any other sequence of actions which involved entering data into the keypad. The circuits of the terminal could be disconnected from the keypad matrix using hardware switches, either electronic or mechanical, or software switches, although for security reasons hardware switches are preferred.

Accordingly, it is preferred that the scanning sequence is only determined by the smart card when the terminal is in a protected mode which is entered under user control and/or smart card control.

The present invention additionally provides a terminal for receiving a smart card, the terminal comprising a smart card port for communicating with the smart card, a keyboard for entering the alphanumeric code, and a keyboard matrix associated with the keyboard for producing a key signal upon entering a character of the alphanumeric code, the terminal further comprising means for scanning the keyboard for any pressed keys using a scanning sequence determined by the smart card. The terminal may further comprise means for passing any key signals directly to the smart card. In this way, it is avoided that the terminal gains knowledge of the key signals.

The present invention further provides a system for subscriber services, the system comprising at least one terminal and at least one smart card and being arranged for utilizing the method as defined above. Such a system may provide paid entertainment services, such as paid television services, or banking services. The present invention also provides a smart card for use in the method and system defined above.

The present invention will further be explained below with reference to exemplary embodiments illustrated in the accompanying drawings, in which:

FIG. 1 schematically shows a smart card terminal according to the present invention.

Figure 2:
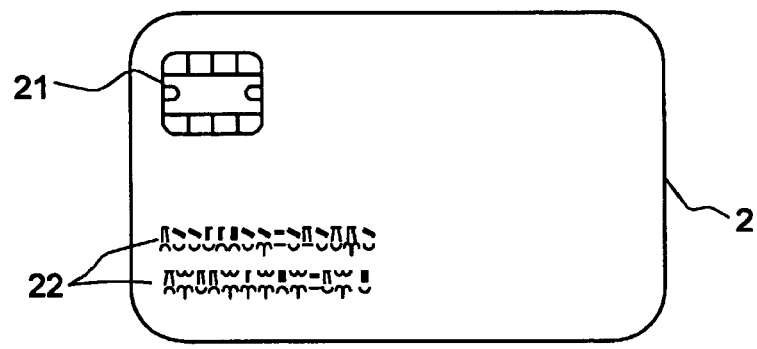

FIG. 2 schematically shows a smart card which may be utilized in the present invention.

Figure 3:
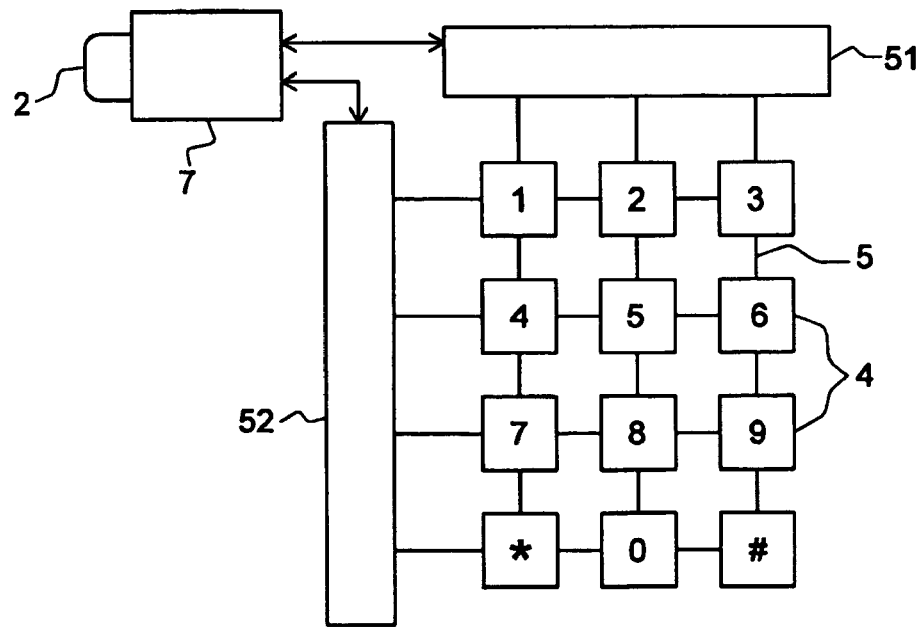

FIG. 3 schematically shows a keypad arrangement according to the present invention.

The terminal 1 shown merely by way of non-limiting example in FIG. 1 comprises a keyboard (keypad) 4, a screen 6 and a card slot 3. A terminal of this type may, for instance, be used as a teller machine for bank transactions. Alternatively, the terminal could constitute, or be part of, a television set, a set-top box, a Personal Digital Assistant (PDA), a games console, a remote control device, a mobile (cellular) telephone, a landline (fixed) telephone, a DVD player, or any similar device having a display (screen) and a keyboard. The display and/or the keyboard may not be accommodated in the terminal housing and may be connected to the terminal by a wired or wireless interface.

The screen 6, which may be a CRT screen, an LCD screen or a similar display device, serves to give instructions to a user and to provide feedback on the use of the keypad 4. A smart card may be inserted in the card slot 3 for smart card transactions. To this end the terminal 1 is provided with a smart card reader (7 in FIG. 3) which may located inside the terminal housing so as to be able to accept a card inserted in the slot 3. As later will be explained in more detail, the terminal 1 is in accordance with the present invention arranged in such a way that the scanning of the keypad matrix is carried out under control of the smart card, not under control of the terminal 1 itself.

An exemplary smart card is shown in FIG. 2. The smart card 2 typically comprises a substrate in which an integrated circuit 21 is embedded. Printed or embossed indicia 22 may identify the card owner and/or the card issuer. The integrated circuit 21 is provided with contacts which enable communication with the smart card reader of the terminal 1. The integrated circuit may in turn comprise a microcomputer including a processor and a memory for storing programs and application data.

The smart card 2 of FIG. 2, which comprises an integrated circuit 21, is additionally provided with a built-in keyboard controller. This keyboard controller may be constituted by a separate integrated circuit but is preferably accommodated in the integrated circuit 21. The function of the keyboard controller will be explained in more detail with reference to FIG. 3, which shows part of the terminal 1 of FIG. 1 in more detail.

The keypad 4 shown merely by way of non-limiting example in FIG. 3 comprises twelve keys, arranged in four rows of three keys. A keypad matrix 5 is arranged such that pressing any key of the keypad 4 will cause one of the rows to electrically contact one of the columns of the matrix. This electrical contact causes a "keypressed" signal to be generated. This keypressed signal is detected by the keypad circuits 51 and 52 and is passed to the smart card 2 by the smart card reader 7 (possibly via a suitable smart card reader interface not shown in FIG. 3). As this keypressed signal merely indicates that a key has been pressed, not which key, the keypad matrix 5 is then scanned to determine which column and which row are involved in the electrical contact which caused the keypressed signal. The combination of the row and the column which are involved in the electrical contact and therefore produce a special signal value identifies the key.

In conventional terminals, the terminal circuitry determines the scanning sequence, which is typically fixed. The keypad circuits 51 and 52 may for example be embodied by counters in a conventional terminal, each counter stepping through the fixed scanning sequence 1-2-3 (column circuit 51) and 1-2-3-4 (row circuit 52) respectively. As these scanning sequences are fixed and determined by the terminal, the actual keys which are pressed are known to the terminal circuitry. In the case of a fraudulent security attack on the terminal, for instance a software attack, the attacker may learn which keys have been pressed. It will be clear that this is highly undesirable, in particular when the keypresses together form a secret code, such as a PIN code.

In accordance with the present invention, however, the rows and columns of the keypad matrix are scanned using a scanning sequence determined by the smart card 2. That is, the smart card 2 produces scanning sequences which are passed to the keyboard matrix via the circuits 51 and 52. These scanning sequences are preferably random and may be generated using the random number generator which is present in most smart cards for cryptographic purposes. Thus the column scanning sequences 1-2-3, 3-2-1, 1-3-2, 2-3-1, etc. may be alternated, as determined by the smart card.

The scanning sequences produced by the smart card are not communicated to the terminal circuitry so that the terminal has no knowledge of the actual keys pressed. To this end, the terminal circuitry preferably has two distinct modes of operation: a protected mode in which the keyboard matrix cannot be read by the terminal circuitry, and a non-protected mode in which the keyboard matrix can be read. The terminal may switch between modes under control of the smart card or under user control. In an advantageous embodiment the terminal detects the presence of the smart card, for example using switches or other sensors arranged in the smart card slot 3 of FIG. 3, and then disconnects the keypad circuits 51 and 52 from the other terminal circuitry. An indicator, such as a special purpose LED or a dedicated screen section, may be used to indicate the current mode to the user.

In an advantageous embodiment, the keypad circuits 51 and 52 are constituted by shift registers into which a single logical "1" is inserted. The location in which the "1" is inserted is, in the protected mode mentioned above, determined by the smart card. As the shift registers have no outputs except to the keyboard matrix, the other terminal circuitry cannot determine the contents of the shift registers and hence cannot determine the key sequence.

It is noted that the term "smart card reader" is generally used for a device which allows two-way communication with a smart card and is therefore not restricted to reading information from the smart card but can also write information to the smart card. It is further noted that in this document the terms keypad and keyboard are used interchangeably. Generally, a keyboard will contain more keys than a keypad but the actual number of keys is not relevant to the present invention.

Although in the above example the terminal 1 was used as a bank teller machine, the present invention is not so limited and may also be applied in set-top boxes for pay-TV, personal computers using smart cards, PDAs (Personal Digital Assistants), and other devices. Additionally, the present invention may be applied in secure images and interfaces for PDAs using a display which creates an image of a keypad and a pointer which may indicate items in the keypad image. In such an embodiment the scanning for the position of the pointer may be carried out similarly to the scanning of the keyboard matrix as described above with reference to FIG. 3. In addition, the keypad image is preferably generated by, or under the control of, the smart card. This allows the layout of the keyboard to be varied, thus reducing the risk of the data entered into the keyboard being recognized by third parties observing the user's actions visually or by using suitable observation devices.

It is noted that the term "smart card" is not limited to a substantially card-shaped substrate in which an integrated circuit is embedded, but is also meant to encompass functional equivalents such as tokens of any shape or size which contain an integrated circuit or similar device and are capable of communicating, either via electrical contacts or wirelessly, with a terminal. The term "smart card" may therefore also encompass a SIM (Subscriber Identification Module) card of a GSM mobile telephone.

The present invention is based upon the insight that a smart card terminal can obtain knowledge of the data entered in the key pad, even when these data are destined for the smart card. The present invention is based upon the further insight that the data entered in the keypad can be "hidden" from the terminal by using a non-standard scanning sequence determined not by the terminal, but by the smart card.

It is noted that any terms used in this documents should not be construed so as limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of providing alphanumeric data to a smart card using a terminal capable of communicating with the smart card, the terminal comprising a keypad for entering the alphanumeric data and an associated keypad matrix for producing key signals, the method comprising the step of scanning the keypad matrix for any pressed keys using a scanning sequence so as to produce key signals, wherein said scanning sequence is determined by the smart card, wherein said scanning sequence is not determined by the terminal.

2. The method according to claim 1, wherein the smart card alters the scanning sequence each time a new set of data is to be entered in the keypad.

3. The method according to claim 1, wherein the smart card determines each scanning sequence using a random number generator.

4. The method according to claim 1, wherein any key signals are passed to the smart card only.

5. The method according to claim 1, wherein any key signals are stored in a secure storage element in the terminal.

6. The method according to claim 1, wherein the scanning sequence is only determined by the smart card when the terminal is in a protected mode which is entered under user control and/or smart card control.

7. The method of claim 1, wherein the terminal has no knowledge of the scanning sequence.

8. A terminal for receiving a smart card, the terminal comprising a smart card port for communicating with the smart card, a keyboard for entering the alphanumeric code, and a keyboard matrix associated with the keyboard for producing a key signal upon entering a character of the alphanumeric code, the terminal further comprising means for scanning the keyboard for any pressed keys using a scanning sequence determined by the smart card, wherein said scanning sequence is not determined by the terminal.

9. The terminal according to claim 8, further comprising means for passing any key signals directly to the smart card.

10. The terminal according to claim 8, which is or is a part of a device selected from the group consisting of: a television set, a set-top box, a Personal Digital Assistant, a games console, a remote control device, a mobile or landline telephone and a DVD player.

11. A system for subscriber services, the system comprising a smart card and a terminal according to claim 8.

12. The system according to claim 11 which is a system for paid entertainment services.

13. The system according to claim 11 which is a system for banking services.

14. The terminal of claim 8, wherein the terminal has no knowledge of the scanning sequence.

15. A smart card for use in a method of providing alphanumeric data to the smart card using a terminal capable of communicating with the smart card, the terminal comprising a keypad for entering the alphanumeric data and an associated keypad matrix for producing key signals, the method comprising the step of scanning the keypad matrix for any pressed keys using a scanning sequence so as to produce key signals, wherein said scanning sequence is determined by the smart card and in a system for subscriber services, the system comprising the smart card and a terminal for receiving the smart card, the terminal comprising a smart card port for communicating with the smart card, a keyboard for entering the alphanumeric code, and a keyboard matrix associated with the keyboard for producing a key signal upon entering a character of the alphanumeric code, the terminal further comprising means for scanning the keyboard for any pressed keys using a scanning sequence determined by the smart card, wherein said scanning sequence is not determined by the terminal.

\* \* \* \* \*